United States Patent

Wicher et al.

[11] Patent Number: 5,977,933
[45] Date of Patent: *Nov. 2, 1999

[54] DUAL IMAGE COMPUTER DISPLAY CONTROLLER

[75] Inventors: Peter J. Wicher, San Mateo; Ronda L. Collier, San Jose; Sridhar Manthani, Los Altos; Zudan Shi, Sunnyvale, all of Calif.

[73] Assignee: S3, Incorporated, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/585,135

[22] Filed: Jan. 11, 1996

[51] Int. Cl.⁶ .................................................. G09G 5/00
[52] U.S. Cl. .................................. 345/3; 345/1; 345/507
[58] Field of Search ............................. 345/3, 1, 2, 199, 345/87, 507

[56] References Cited

U.S. PATENT DOCUMENTS

| | | | |
|---|---|---|---|
| 4,740,786 | 4/1988 | Smith | 340/784 |
| 4,751,502 | 6/1988 | Ishii et al. | 340/709 |
| 4,760,387 | 7/1988 | Ishii et al. | 340/716 |
| 4,855,728 | 8/1989 | Mano et al. | 340/805 |
| 4,860,246 | 8/1989 | Inoue | 364/900 |
| 4,922,448 | 5/1990 | Kunieda et al. | 364/900 |
| 4,926,166 | 5/1990 | Fujisawa et al. | 340/717 |
| 4,980,678 | 12/1990 | Zenda | 340/716 |
| 4,990,902 | 2/1991 | Zenda | 340/731 |
| 4,998,100 | 3/1991 | Ishii | 340/784 |
| 5,072,411 | 12/1991 | Yamaki | 395/162 |
| 5,111,190 | 5/1992 | Zenda | 340/717 |
| 5,138,305 | 8/1992 | Tomiyasu | 340/717 |
| 5,150,109 | 9/1992 | Berry | 345/132 |
| 5,155,478 | 10/1992 | Sekiya et al. | 340/793 |
| 5,196,839 | 3/1993 | Johary et al. | 340/793 |
| 5,218,274 | 6/1993 | Zenda | 315/366 |
| 5,233,331 | 8/1993 | Comerford et al. | 340/712 |
| 5,272,471 | 12/1993 | Asada et al. | 345/149 |
| 5,293,485 | 3/1994 | Zenda | 395/164 |
| 5,373,307 | 12/1994 | Shiraishi | 345/2 |
| 5,396,258 | 3/1995 | Zenda | 345/3 |
| 5,475,402 | 12/1995 | Hijikata | 345/211 |
| 5,479,183 | 12/1995 | Fujimoto | 345/3 |
| 5,479,184 | 12/1995 | Tokumitsu | 345/3 |
| 5,488,384 | 1/1996 | Uehara et al. | 345/1 |
| 5,488,385 | 1/1996 | Singhal et al. | 345/3 |
| 5,491,496 | 2/1996 | Tomiyasu | 345/147 |
| 5,500,654 | 3/1996 | Fujimoto | 345/132 |

*Primary Examiner*—Xiao Wu
*Attorney, Agent, or Firm*—Skjerven, Morrill, MacPherson, Franklin & Friel LLP; Norman R. Klivans

[57] ABSTRACT

A display control system for a portable computer drives, from a single frame buffer, both a built-in flat panel (LCD type) display as well as a separate external CRT display or an NTSC/PAL television monitor. Either identical or different images may be displayed simultaneously on the CRT display or television and on the flat panel display. Independent clocking is provided to each display to enable this simultaneous display of different images as well as simultaneously display of identical images. The display control system is suitable for use with a wide variety of CRT displays and flat panel displays by means of internal programmable controls.

30 Claims, 12 Drawing Sheets

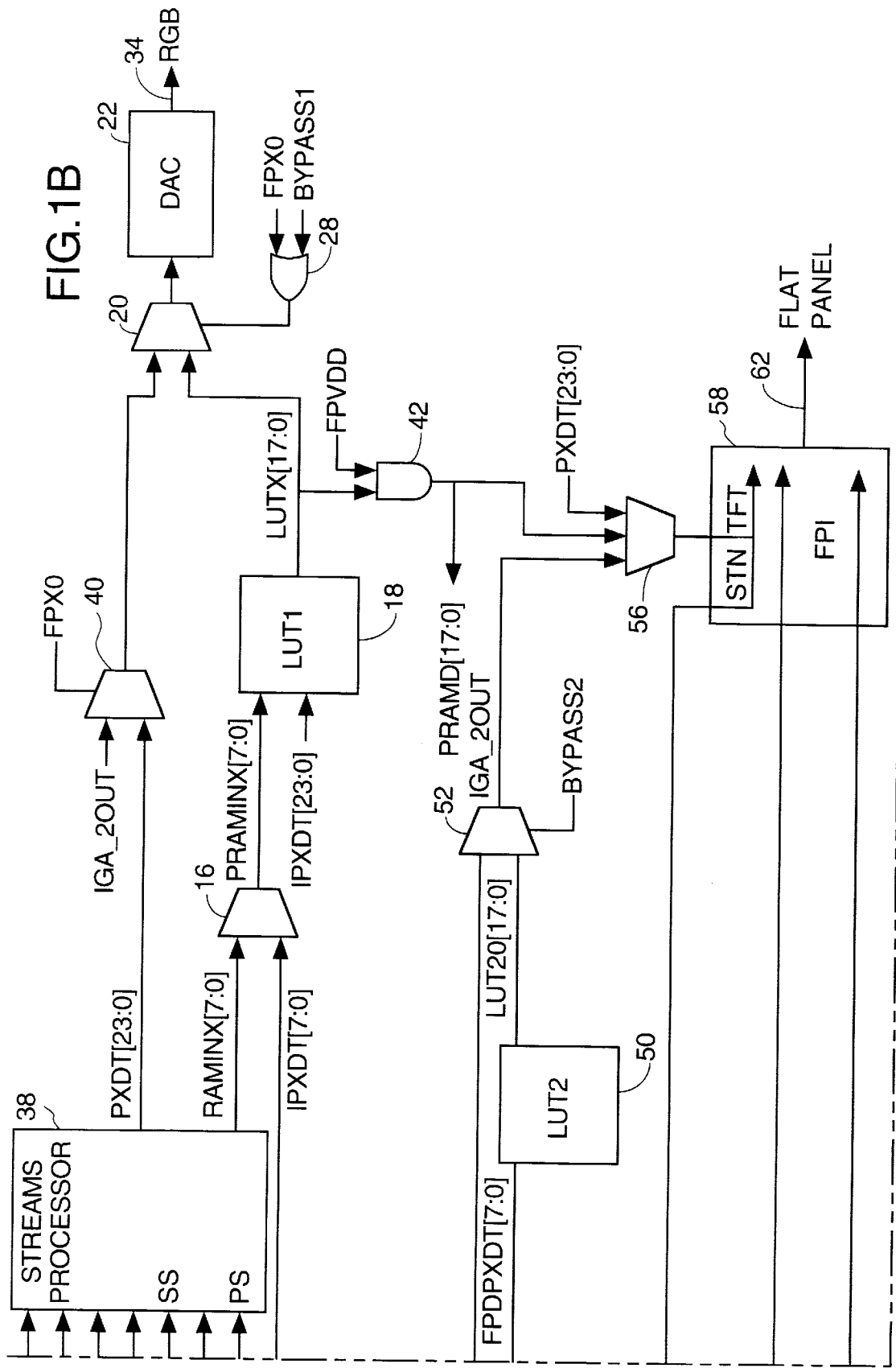

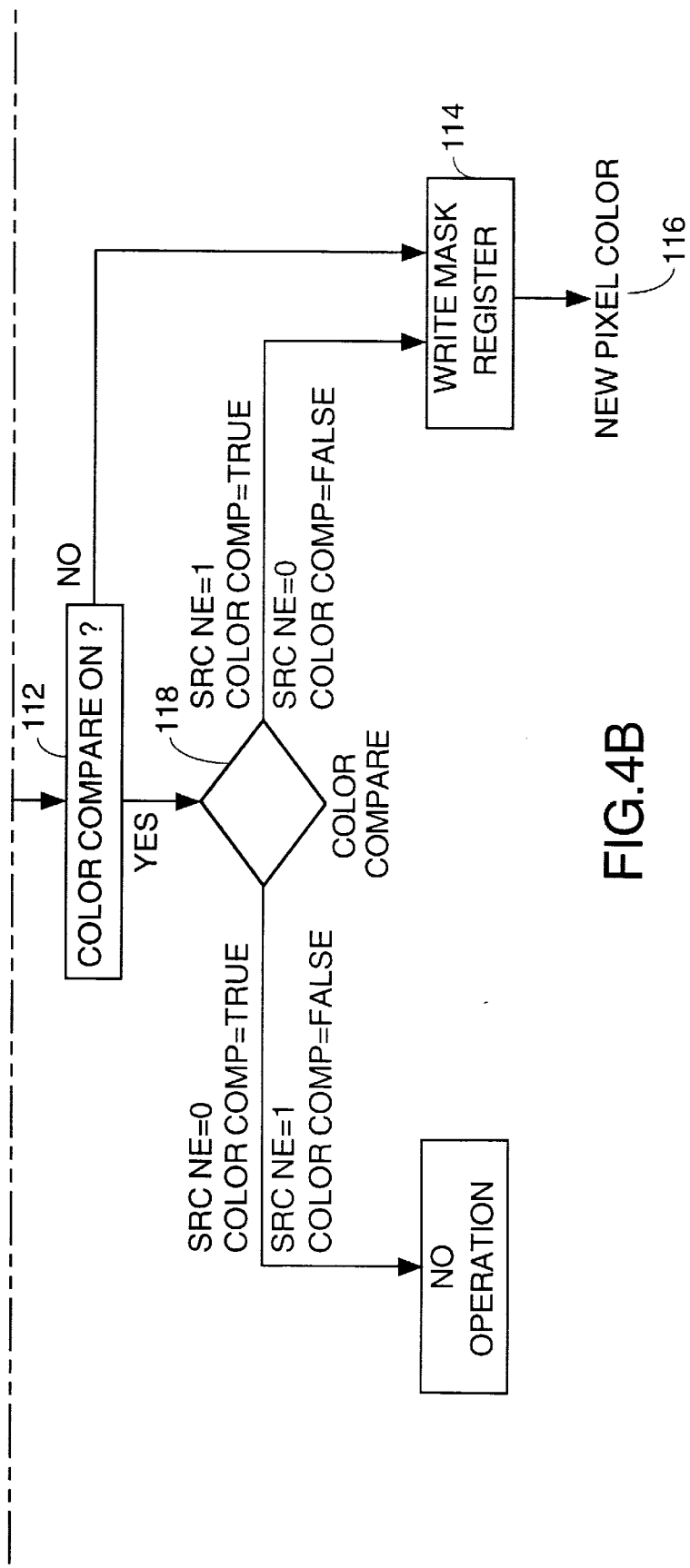

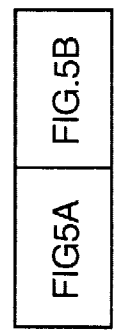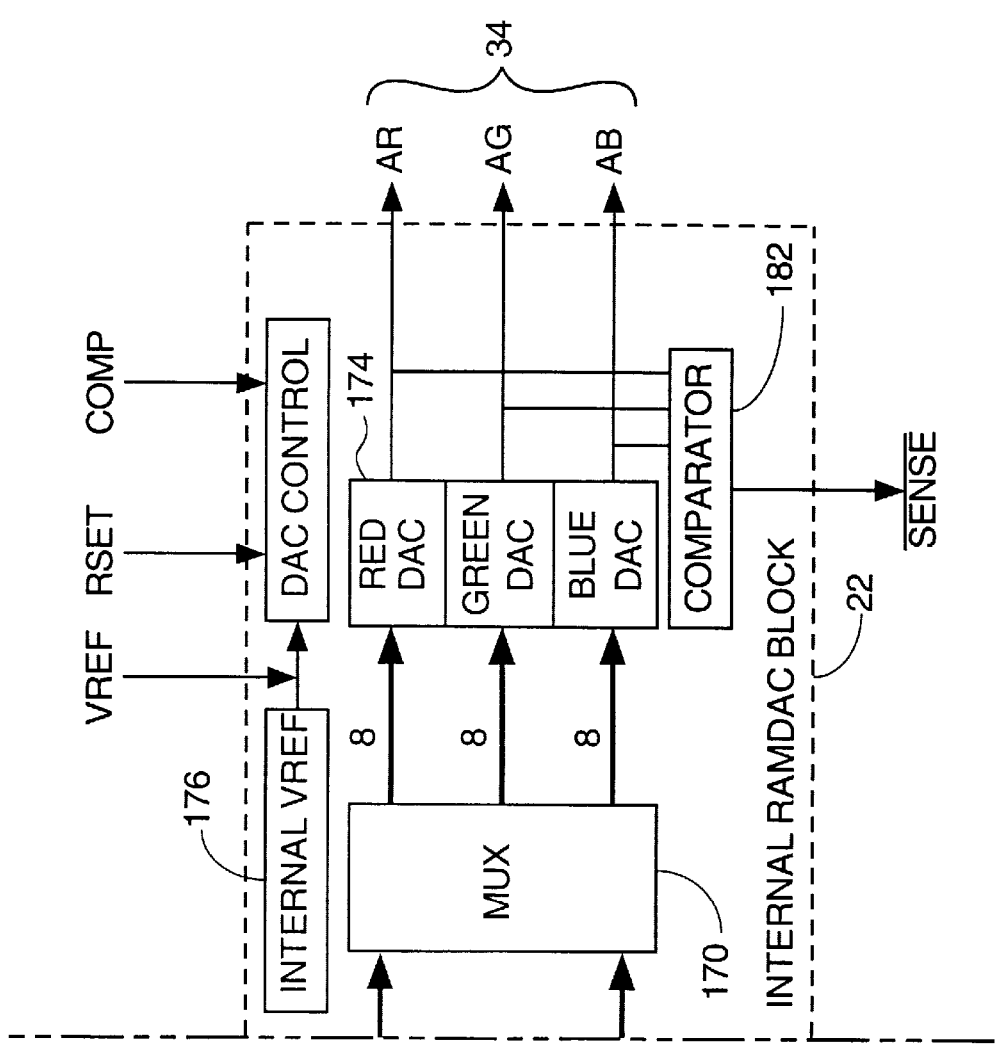
FIG.5B

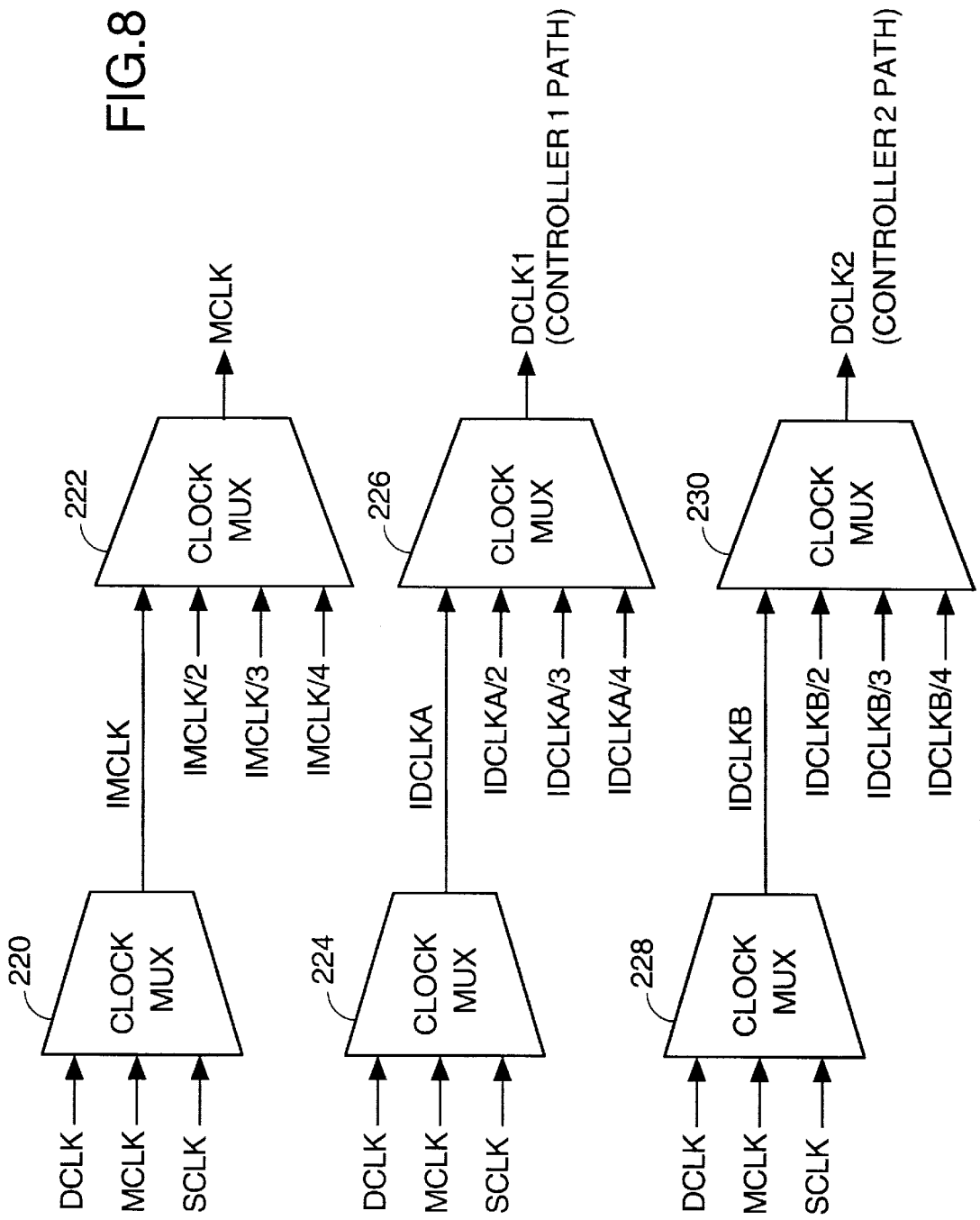

DUAL IMAGE COMPUTER DISPLAY CONTROLLER

BACKGROUND OF THE INVENTION

1. Field of the Invention

This invention relates to computer systems and more specifically to a computer display controller especially suitable for use in portable computers having a flat panel-type display.

2. Description of the Prior Art

Portable computers, i.e. notebook computers and other types of portable computers, typically include an LCD-type display, also referred to herein as a flat panel display. This is in contrast to the CRT (cathode ray tube) type display typically used for larger desk top computers. These flat panel displays come in various types, including TFT (thin film transistor) active matrix type and STN (super twisted nematic) passive matrix type. Both of these support color imagery. Flat panel displays variously have 8 bit, 9 bit, 16 bit, 18 bit, 12 bit, or 24 bit per pixel etc. interfaces and have various screen resolutions in terms of numbers of pixels and characters, as well as various refresh rates. Passive matrix type (STN) flat panel displays are dual scan, i.e. they typically include two displays which are physically vertically contiguous to each other, one being the upper panel and the second being the lower panel, each requiring its own driver circuitry. A controller drives these two half-displays and provides all parameters in terms of screen resolution, bits per pixel (number of colors), refresh rate and horizontal scan rate. A computer display/graphics subsystem includes a controller and a frame buffer where the image is stored and manipulated, independent of the computer's main memory.

The other type of computer display, which is the CRT-type display, also has its own parameters in terms of screen resolution, number of colors/shades, horizontal scan rate, and refresh rate. Such CRT-type displays include a CRT display and a television-type monitor.

For a portable computer, it is desirable in addition to the built-in flat panel display to connect an external CRT-type display or television. This is typically done when at one's office to use two displays, or for instance during a presentation when the presenter is using his portable computer to drive a video projector or monitor for viewing by an audience, while the presenter looks at the computer flat panel display and thereby can face the audience.

In these applications either identical or different images are presented on the two displays, i.e. the flat panel display and the CRT. A prior art product is the Apple Powerbook™ portable computer which in order to support two such displays, projecting different information simultaneously and independently, includes two separate display controller systems, one driving the flat panel display and the second driving the CRT display. Thus there are two display controllers and two frame buffers, i.e. two complete display subsystems, one dedicated to each display. This is expensive in terms of circuitry and also consumes more power than is desired. Other prior art portable computers, while they can simultaneously provide images both on the built-in flat panel display and on the connected external CRT display, can display only a single identical image on both, since they include only a single display controller system. Thus the prior art solution to providing a dual image mode is a 'brute force" approach requiring expensive and power consuming circuitry as in the Apple Powerbook product. Dual image mode refers to the capability where the image on each display is independent and can be separately manipulated.

SUMMARY

In accordance with the present invention, a display controller system for a portable computer includes a single frame buffer which stores display data for two video data paths, each data path including a display controller which provides display control timing. The first path, which drives the CRT or television display, also includes a suitable digital to analog converter (DAC) and other circuitry for generating the timing signals for the CRT or television display. The second data path, which drives the flat panel display, includes a second display controller and flat panel display interface circuit. Thus a single frame buffer with minimal additional circuitry provides a dual image mode capability, whereby the CRT display or television display and the flat panel display can simultaneously and independently display different images. The timing of each path for the dual image mode can be completely asynchronous, as if there were two separate controllers.

The two displays can simultaneously display the same image if desired. Another feature present in accordance with the invention is the capability to support a variety of CRT or television displays and flat panel displays. Another feature is a keyer (a video stream processor) present in at least one of the data paths for allowing blending in of graphics-type data (e.g. icons or cursors) with the displayed video. A clocking scheme is provided whereby internal clocking circuitry provides a separate set of clocking signals at different frequencies for each of the first and second data paths, in accordance with the needed clock frequency for the CRT/television display or the flat panel display.

BRIEF DESCRIPTION OF THE DRAWINGS

FIG. 8 shows clock signal synthesis for the circuit of FIG. 1.

DETAILED DESCRIPTION

1. Video Data Path

Figure 1A:
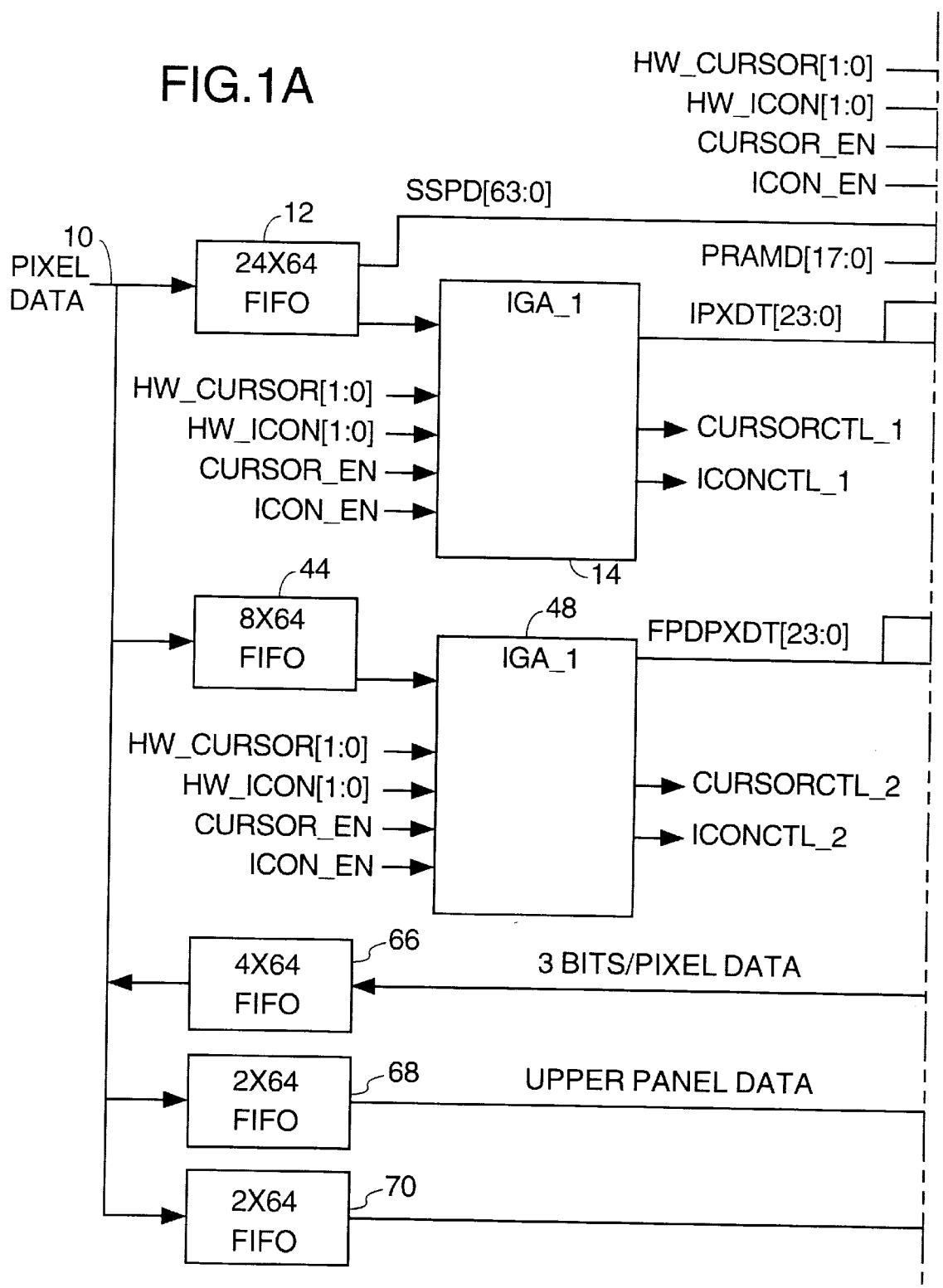
FIG. 1 shows a block diagram of the video data path in accordance with the present invention.
Figure 1C:
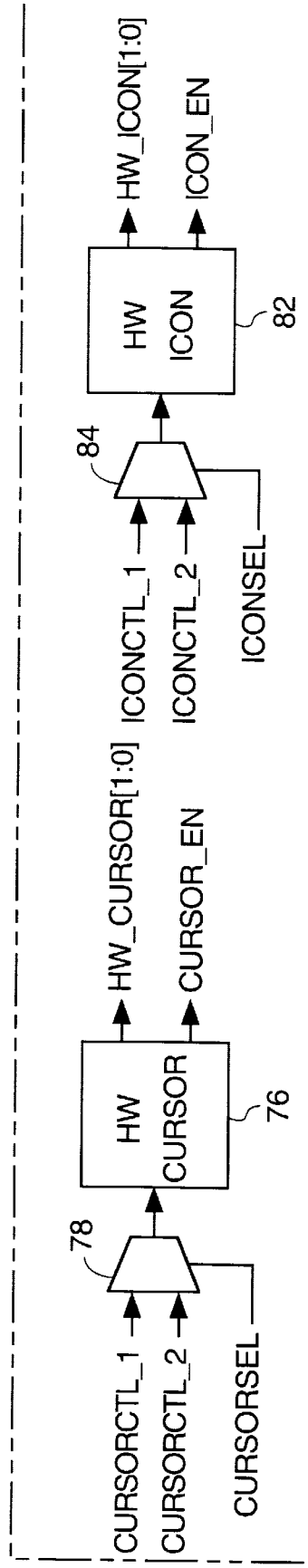
Figure 1:
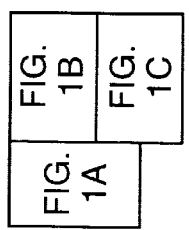

FIG. 1 shows a block diagram of the video data path of a display control system for use in a computer in accordance with the present invention. It is to be understood that in one implementation the circuitry shown in FIG. 1 is embodied in a single integrated circuit. Similar circuitry could be implemented in custom circuitry or distributed over a number of integrated circuits. Also, each of the blocks of FIG. 1 is conventional and of a type well known in the art. Similarly the various connections shown are well known in the art; the novelty here lies in the provision of two video data paths both driven by pixel data supplied by a single video memory (frame buffer) in order to drive independently a CRT display or television display and a flat panel display. Thus in accordance with the invention a dual image capability is provided whereby separate images may be displayed on the two displays, in spite of there being only a single frame buffer present in the computer. It is to be understood that the reference here to a CRT display also includes for instance NTSC television monitors and any other similar type of display, in contrast to the LCD-type flat panel displays.

The incoming video data (here called pixel data) is provided on bus 10 which is conventionally a 64 bit bus connected to the output port of a conventional frame buffer (not shown). The pixel data on bus 10 is then provided to a 24 bit by 64 bit FIFO (first in-first out) memory 12 which is present for buffering purposes. The output port of FIFO 12, which is a 64 bit bus, is connected to an input port of a conventional IGA-type CRT controller (IGA-1) designated by reference number 14. IGA-1 is a conventional CRT controller of the type for instance present in the commercially available Trio 64 V+ part from S3 Incorporated. IGA-1 generates cursor, CPU, character and display frame buffer addresses as well as generating the final display and timing signals.

The chief output port of IGA-1 is connected to a 24 bit bus (here designated IPXDT) providing the output video data for the first video path. Eight bits (bits 0 to 7) of this data on bus IPXDT are provided as a first input signal to multiplexer 16. This is the typical 8 bit video data used for display purposes. The entire 24 bits of video data on bus IPXDT are also provided as an input signal to a first lookup table (LUT 1) designated by reference number 18. LUT 1 is provided herein because the system shown in FIG. 1 is programmable for use with a number of different CRT displays. Thus a large number of CRT display modes are supported in terms of text, graphics, black and white versus color, refresh rate, pixel clock frequency, bits per pixel, and screen resolution in terms of characters and pixels. This is conventional in such display controllers and LUT 1 functions conventionally in this way.

The chief output signal from LUT 1 on 18 bit bus LUTX is video data supplied to the first input port of multiplexer 20. When selected by multiplexer 20, this data is provided as an input signal to DAC (digital to analog converter) 22. DAC 22 is a RAMDAC and also includes a conventional NTSC/PAL encoder. The output of DAC 22 is a conventional RGB video signal on line 34 which is provided to the CRT or television display.

The upper portion of FIG. 1 shows the streams processor 38. This is in a secondary video stream on upper video data path for purposes of graphics, for instance cursor and icon support. The streams processor thus is a conventional video keyer for blending graphics data into the live video. The two video paths, i.e. the upper path including IGA-1 and the lower path including IGA-2, are not symmetric in this particular embodiment and hence there is a streams processor only in the upper path. However, in other embodiments a streams processor is present in both paths, or alternatively in neither.

The input signals to the streams processor 38 are variously the hardware cursor HW-CURSOR, the hardware icon HW-ICON, the cursor enable signal CURSOR-EN and the icon enable signal ICON-EN. These are generated as shown in the lower portion of FIG. 1 by cursor and icon control signals to respectively multiplexers 78 and 84, so the signals for streams processor 38 are generated by cursor logic 76 and icon logic 82.

The chief output signal of streams processor 38 is the 24 bit pixel data on bus PXDT which is provided as a first input to multiplexer 40 which selects between that data and the IGA-2 out data provided by IGA-2, IGA-2 being designated by reference number 48. This selection is controlled by a control signal here designated FPXC which is controlled by a user-controlled hardware register. Thus multiplexer 20, in combination with multiplexer 40, allows selection of which signal is provided to DAC 22. Note that the cursor control and icon control signals CURSORCTL-1 and ICONCTL-1 are provided by IGA 1 and these signals in turn are inputs to the cursor select multiplexers 78 and 84. Similarly, signals CURSORCTL-2 and ICONCTL-2 are provided bay IGA-2.

In the second video path (which is the lower portion of FIG. 1), the output of AND gate 42 is provided as one input signal to multiplexer 56. Signal PRAMD is on an 18 bit bus and is the graphics input signal to the streams processor 38. The graphics background colors are finalized in the LUT, then blended with an overlay in the streams processor 38. The second input signal to AND gate 42 is the control signal FPVDD, which is the power management control signal for the flat panel section. If FPVDD is high, the panel is present and on, therefore data passes through AND gate 42 to FPI 58.

The control signal for multiplexer 20 is provided by an OR gate 28, the input signals to which are signal FPXO and the bypass signal BYPASS1. These are control signals set by application software and user-controlled registers. If signal BYPASS1 is high, multiplexer 20 selects as the output to DAC 22 the 24 bit "direct color" output of IGA-1 as the input signal. If signal FPX0 is high, then the signals from IGA-2 are passed to the DAC 22. Thus either IGA-1 or IGA-2 can provide output signals to the CRT display. Signal BYPASS1 is set for direct color modes by application software (e.g. video games). The user can set signal FPXO if he wants IGA-2 to provide output to the CRT display.

Referring further to the second video path in the lower part of FIG. 1, the first portion of this is somewhat similar to that of the upper video path. That is, the 8 bit by 64 bit FIFO 44 provides on a 64 bit bus an input signal to the main input port of IGA-2 designated by reference number 48. The chief output port of IGA-2 is a 24 bit bus FPDPXDT which carries the flat panel display pixel data. The first 8 bits of this bus are provided as the input to the second lookup table LUT 2 designated by reference number 50. IGA-2 performs the function of supporting a large number of timing and data formats for display modes. The FPI 58 formats data for a large number of types of flat panel displays. Typical supported displays include a range of screen resolutions in terms of pixels and characters, number of data bits per pixel, color versus black and white, and (TFT) displays as well as STN displays. The intention herein is to support a large number of types of such displays. However, it is to be recognized that in one embodiment of the invention only a single type of flat panel display is supported, since typically the flat panel display is built into the computer and it will not be changed.

Note that in one embodiment standard IBM VGA video modes are supported for the flat panel display as well as for the CRT display in the upper video path. In one embodiment all standard IBM VGA video modes are supported for a simultaneous display of the same data for both the flat panel display and the CRT display. Also the flat. panel display and the CRT display may have different images in the dual image mode. The flat panel display and the external displays will have a different pixel clock, as explained below, to enable independent operation for optimum image quality in the simultaneous display mode. This capability also allows simultaneously display of identical data on both the flat panel display and on a television display.

In one embodiment during simultaneous display there are situations which restrict the output of the streams processor 38 to be displayed on the CRT display or the flat panel display but not both.

The output port of LUT 2 is a 18 bit bus LUT20 which is a first input to a multiplexer 52, the second input to which is the full 24 bits of flat panel display data on bus FPDPXDT. The control signal BYPASS2 controls, via multiplexer 52, which of these two busses is to be connected to the bus here designated IGA-20UT which is a 24 bit bus which is an input to application software controlled multiplexer 56. Signal BYPASS2 is set by the application software. A third input to multiplexer 56 is the data on bus PXDT which is the output from the streams processor 38.

The purpose of multiplexer 56 is to control which data stream (graphics from IGA-1 or IGA-2 or graphics with a video overlay from IGA-1) is displayed on the flat panel display. Multiplexer 56 is controlled by a signal from an end-user utility program or by specific application software which calls the BIOS to set a register with a control bit.

The output port of multiplexer 56 is connected to the chief input port to the flat panel display interface (FPI) 58. The flat panel display interface 58 thereby accepts 24 bits of digital RGB data which is the output of the streams processor 38 or from IGA-2 or from LUT 1 and converts this into data which is provided directly to the flat panel display. Hence, flat panel display interface 58 is a conventional LCD driver. Shading and dithering processes of the type disclosed e.g. in copending and commonly owned U.S. patent application Ser. No. 08/519,690, filed Aug. 24, 1995 entitled "Gray Scale Shading for Liquid Crystal Display Panels" invented by Nirmal Saxena et al. (incorporated herein by reference) are carried out in FPI 58 to provide a very high quality image. FPI 58 also provides conventional controls to properly sequence the power to a flat panel display during power on and power down as well as power saving modes.

FPI 58 conventionally drives both TFT panels as well as STN panels in various modes. However, these various modes are not necessary, and in one embodiment FPI 58 supports only a single type of flat panel display.

FIFOs 68 and 70 connected to bus 10 conventionally provide data referring to the upper panel and lower panel of the flat panel display. This is to support flat panel displays which conventionally are of two portions ("dual scan") which are driven separately and require separate address and control data. The third FIFO 66 accepts three bits per pixel of data from FPI 58 and transmits it back along the pixel data bus for purposes of storing in memory a half or full frame of graphics/video data for later display on the STN panel.

2. Structure and Operation of the Video Data Path

Further detail of the internal structure and operation of the various blocks in FIG. 1 as well as associated circuitry is provided hereinafter.

Figure 2:
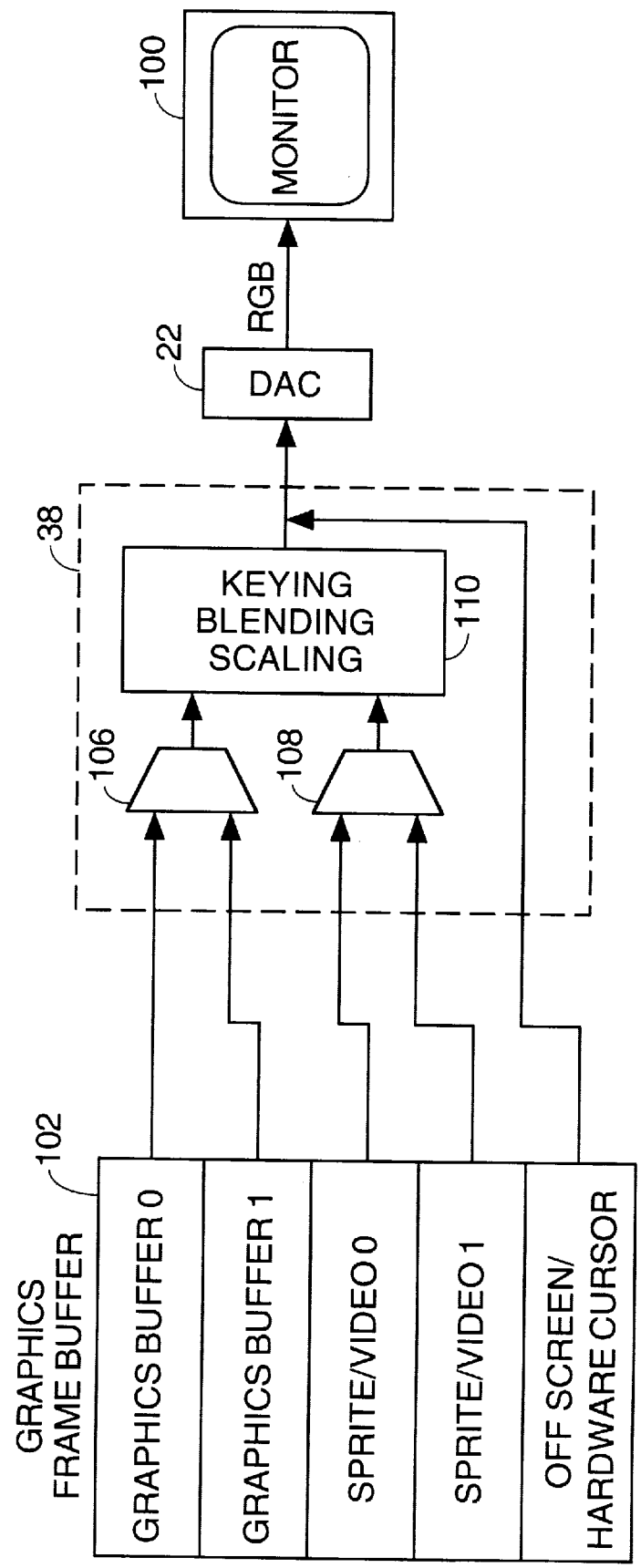
FIG. 2 shows operation of the streams processor of FIG. 1.

FIG. 2 illustrates functioning of the streams processor 38 of FIG. 1 in additional detail. The streams processor 38 processes data from the graphic screen buffer, composes and outputs the result to the internal digital to analog converters for generation of the analog RGB outputs to the monitor 100 (not shown in FIG. 1).

The graphics frame buffer 102 provides the pixel data to streams processor 38. (Graphics frame buffer is a part of the offscreen memory, not shown in FIG. 1.) Thus the streams processor includes multiplexing functions 106, 108, and scaling, blending, and keying logic 110 of the type conventionally used.

Streams processor 38 composes data from up to four independent streams as shown in FIG. 2, these streams being a primary stream of RGB graphics data, a secondary stream of RGB or YUV/YCbCr (video) data from another region within the frame buffer, or hardware icon data or hardware cursor data. This is also illustrated in FIG. 1 wherein the primary and secondary streams are provided on bus SSPD.

Regardless of the input formats, the streams processor 38 creates a composite RGB-24 (8.8.8 bit) output to the digital to analog converter (DAC) 22. Thus RGB-8 pseudo-color graphics data can be overlaid with true-color-equivalent (24 bits/pixel) video data. This improves video quality and/or reduces memory bandwidth requirements compared to other systems requiring both graphics and video to be stored in the same frame buffer format. The streams processor may also save memory bandwidth by eliminating the requirement to save and restore the overlay background since the background (primary stream) is never overwritten in the frame buffer 102.

The primary video data stream is generated by reading the RGB pixel data written to the frame buffer 102 by the graphics controller IGA-1. The format for this data can be any one of a variety of conventional video formats. The secondary stream is generated by reading pixel data from a separate section of the frame buffer than that used to generate the primary stream. This may be RGB data written by the graphics controller such as a "sprite" used by game programmers for moving objects. It may also be other types of video data.

Figure 3:
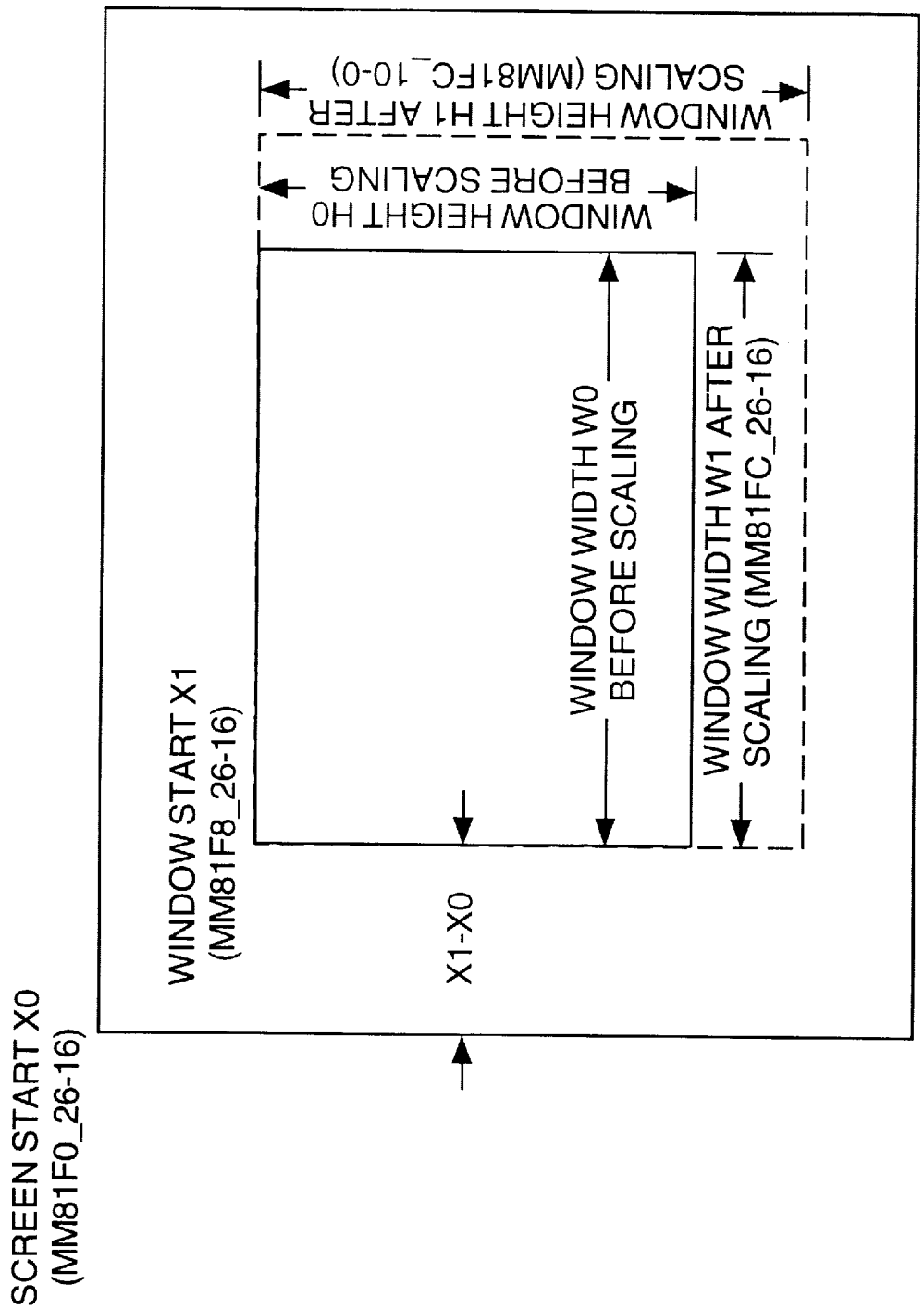
FIG. 3 shows screen definition parameters for the video overlay window which displays blended graphics and data.

FIG. 3 shows screen definition parameters as set by the streams processor 38. For each stream to be used, the starting location (offset) and the frame buffer and the stride (byte offset between vertically adjacent pixels on the screen) is specified. The frame buffer organization and associated double buffering depicted in FIG. 2 are provided conventionally via registers. (The various register fields and bit sizes are denoted by MM in FIG. 3.) These screen parameters are exemplary and not limiting.

Figure 4A:
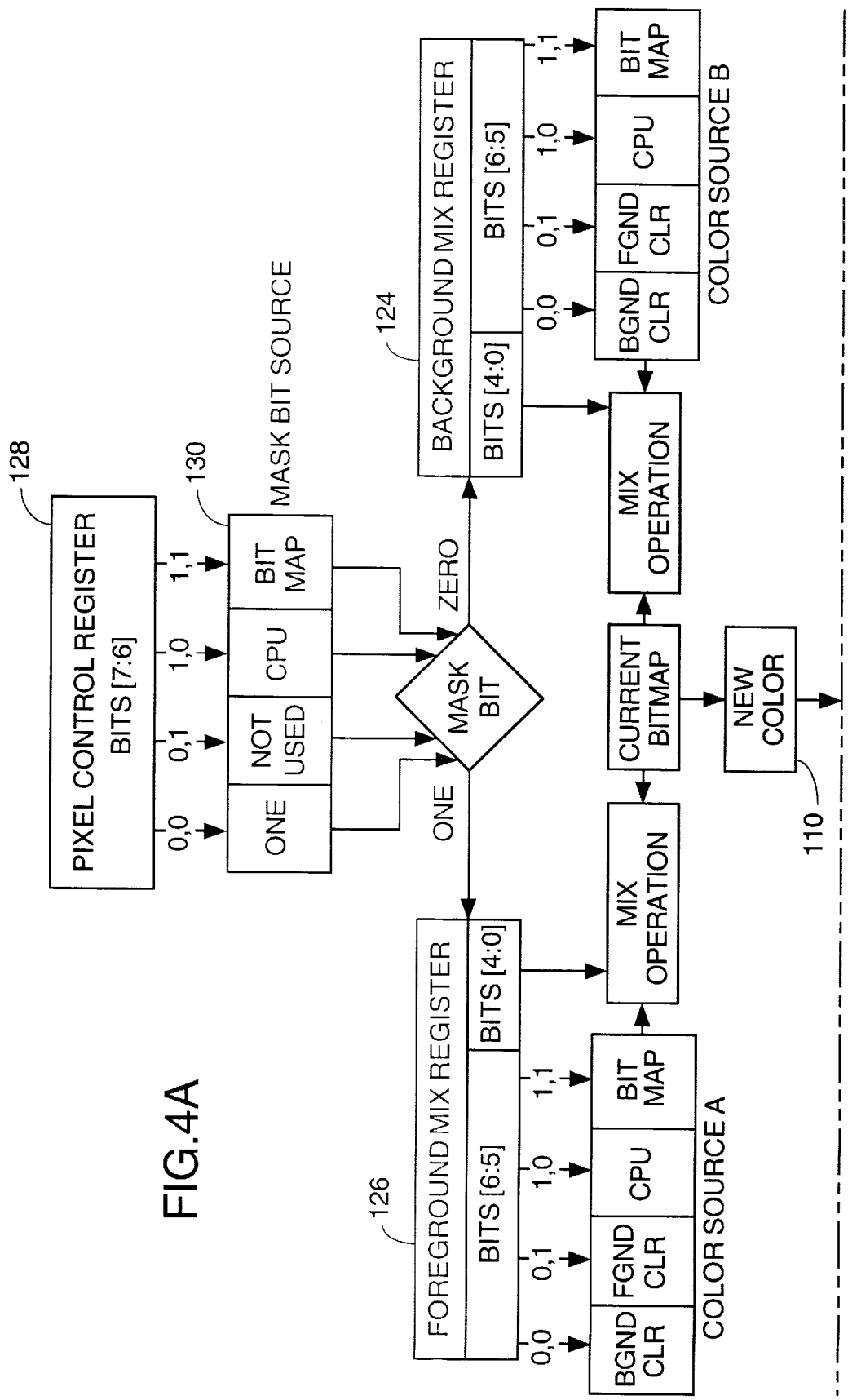
FIG. 4 shows a pixel update flowchart.

FIG. 4 shows a pixel update flow chart for implementing for instance hardware line drawing, B/T BLT, rectangle fill and other drawing functions for instance as well as data manipulation functions such as data extension, data source selection and read/write bitplane control. Hardware clipping is also supported. This is accomplished by the register structure as shown in FIG. 4. Thus FIG. 4 is a flow chart showing the updating of the color of each pixel with reference to the particular registers used.

Beginning at the New Color step 110, at this stage a color has been determined that may or may not be used to update a pixel in the bitmap. The next step is the Color Compare step 112. If this bit is off, the new color is passed to the write mask register 114. If the plane to which the pixel update is directed has been masked off in this register, no color update occurs. Otherwise the new color value is written to the bitmap at step 116.

If the color compare is on (enabled) at step 112, the new color value (source) is compared at step 118. If the relevant bit in the register SRC NE (source not equal) is equal to 0, then the color comparison step has a true result. If the value in this register is 1, the color comparison is a false result. Thus, if this bit is 0 the new color pixel value is passed to the write mask only when the source color does not match the color in the color compare register. If this bit is 1, the new pixel color value is passed to the write mask only when the source color matches the color in the color compare register. If the new pixel color value is not passed to the write mask, no update occurs. Note that the source color is used for the comparison, as opposed to the destination/bitmap color used by the standard VGA color compare operation.

The color source and the logical mix operation desire are specified either in the Background Mix register 124 or the Foreground Mix register 126. The new color is a result of a logical mix performed therefore on a color source and the current color in the bitmap. For instance the color source could be logically exclusively or combined with the bitmap color.

Thus the programming must specify one of four color sources by writing bits 6–5 of the Background Mix and Foreground Mix Registers. The color sources are a Background Color (BGND CLR) register, a Foreground Color (FGND CLR) register, the CPU, or a current display bitmap (BIT MAP) color index.

When the logical operation and color source have been specified in the Background and Foreground Mix registers, bits 7–6 of the Pixel Control register 128 are written to specify the source of the mask bit value. If the resulting mask bit is a 1, the Foreground Mix 126 register is used to determine the color source and mix. If the mask bit has a value of 0, the Background Mix register 128 is used to determine the color source and mix. The sources of the mask bit value are always 1, the CPU, or the bitmap. Setting bits 7–6 to the value 00b sets the mask bit to the value 1.

If bits 7–6 are set to value 10b, the mask bit source is the CPU. After a draw operation command is issued to the drawing command register (not shown), a mask bit corresponding to every pixel drawn on the display must be provided via pixel data transfer registers (not shown). If the mask task bit is 1, the Foreground Mix register 126 is used. If the mask bit is 0, the Background Mix register 124 is used. If the color source is the CPU, the mask bit source cannot also be the CPU and vice-versa. If bits 7–6 are set to 11b, the current display bitmap is selected as the maskbit source.

Figure 5A:
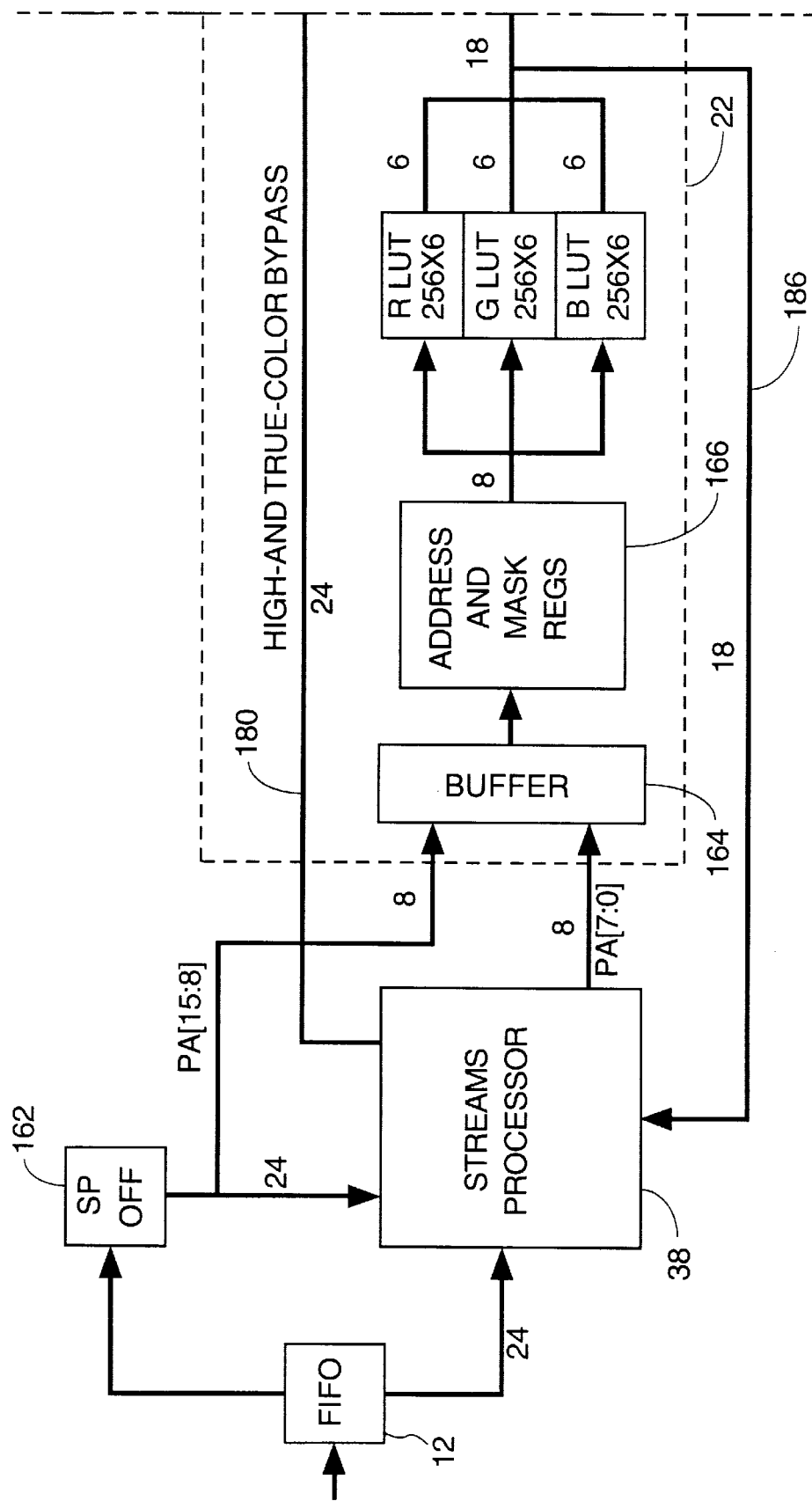
FIG. 5 shows a RAMDAC of FIG. 1.

As shown in FIG. 1, an analog RGB output 34 is provided to a CRT or an NTSC/PAL conventional television monitor. only one of these modes is typically active at one time. Thus FIG. 5 shows in greater detail elements of FIG. 1, especially the digital to analog converter (RAMDAC) 22. The SP OFF block 162 provides the function of turning the streams processor 38 on or off for purposes of providing an overlay or not. RAMDAC 22 provides six color modes or three primary types of modes which are 8 bits, 16 bits, and 15 or 16 bits or 24 bits respectively. RAMDAC 22 includes 3 internal 8 bit DACS 174 (one each for red, green and blue) which are fed via multiplexer 170 for 8 bits per pixel CRT modes by one of two internal color lookup tables (LUT) 168 which are conventional random access memories.

The source color lookup table depends on the CRT/flat panel output configuration. Each color lookup table provides 256 six bit words for each color. A clock doubled mode is also provided for 8 bits/pixel modes. A 24 bit color lookup table bypass 180 is provided for 15/16 and 24 bit color modes. This is provided directly from streams processor 38. Also provided conventionally are a buffer 164 and address and mask registers 166.

Also provided are an internal voltage reference 176 and a digital to analog control logic 178 as shown. Thus the streams processor may be on or off for this purpose. When it is off, data from the video FIFO memory 12 is processed by another companion chip and then passed directly to the RAMDAC 22. This mode is used for those video modes not supported by the streams processor 38.

When the streams processor is on, memory data is passed directly to the streams processor 38. The resulting data is then passed directly to the RAMDAC 22 where it is interpreted as explained above and returned to the streams processor 38 by transmission via the color bypass bus 180. The sense signal from comparator 182 is read to detect the existence and type of monitor (color/monochrome) connected to the system.

Figure 6:
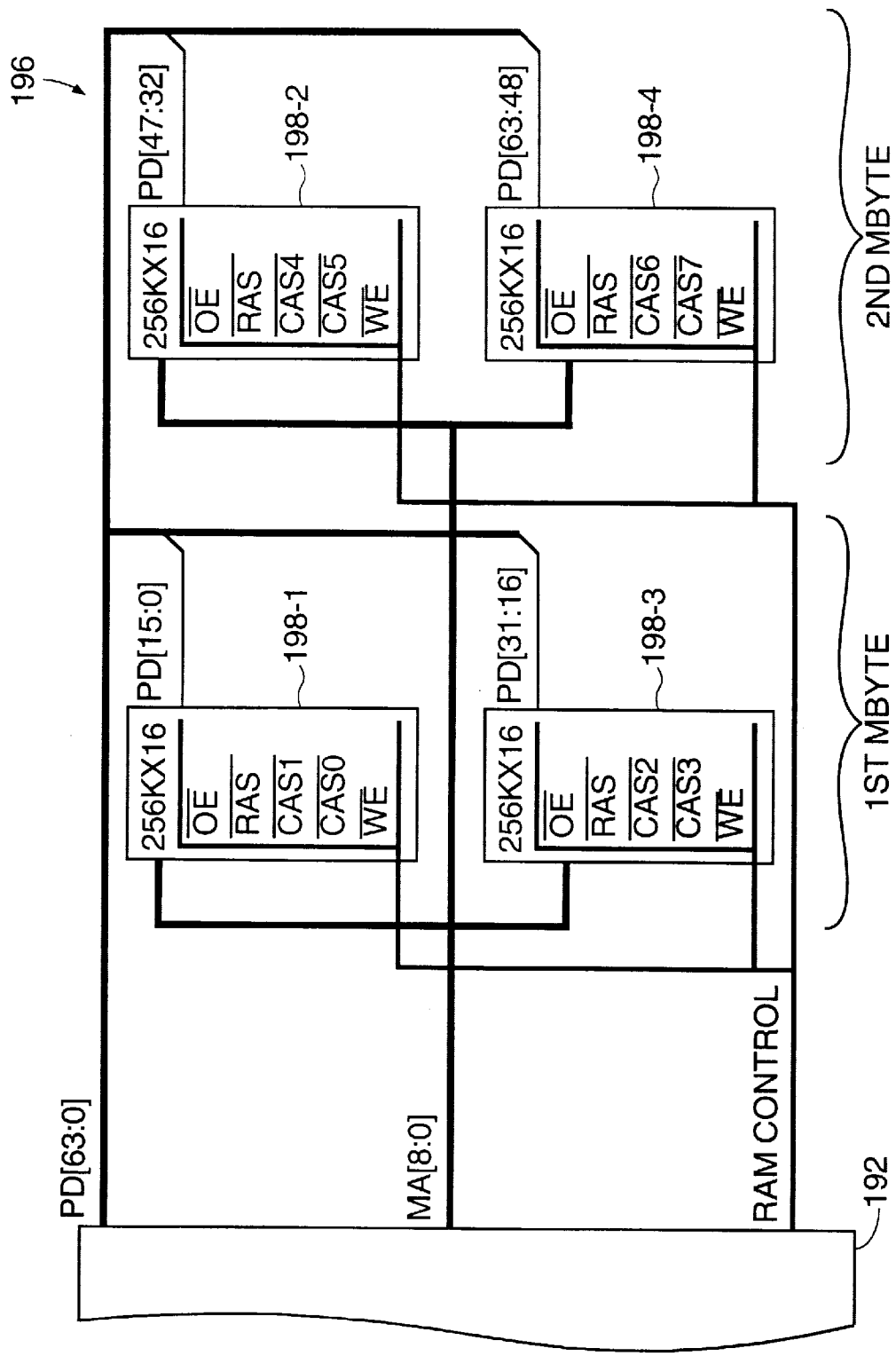
FIG. 6 shows a display memory of FIG. 1.

The present system supports a DRAM based video frame buffer 196 as shown in FIG. 6 where block 192 represents the remainder of the system. Typically the frame buffer 196 is a set of separate chips from the above-described processing circuitry, but this is not necessarily required. The display memory configuration as shown in FIG. 6 is in fast page mode or extended data out (EDO) dynamic random access memory (DRAM) for frame buffer 196, with support for single cycle EDO operation. In this case, 256K×16 dual CAS DRAMs are supported. FIG. 6 shows 1 and 2 megabyte configurations wherein either fast page or EDO memory can be used. The pixel data (PD) bus with one megabyte of memory is a 32 bit bus.

A chip in accordance with the present invention as shown for instance in FIG. 1 includes two phase locked loop (PLL) frequency synthesizers. These generate the DOLK (video clock) and MCLK (memory clock) signals used by e.g. IGA-1 and IGA-2 (the clock signals are not shown in FIG. 1 for simplicity).

Figure 7:
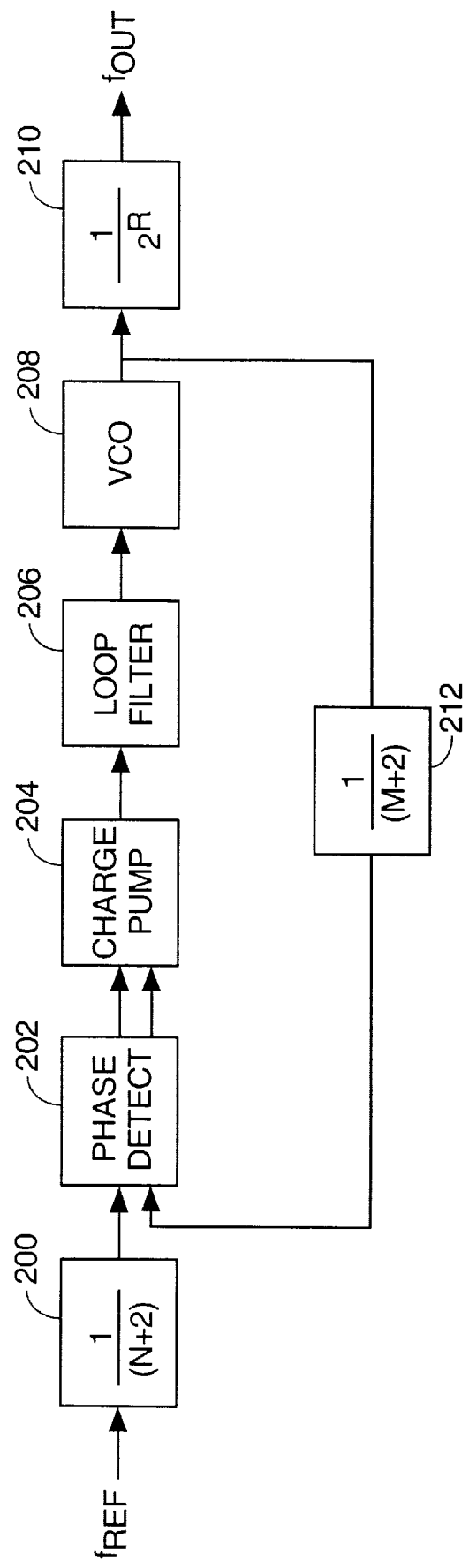
FIG. 7 shows a phase lock loop for use with the circuit of FIG. 1.

One such PLL is shown in a block diagram in FIG. 7, wherein the reference frequency is supplied externally or from a crystal oscillator. The output synthesized frequency $f_{out}$ is determined by the equation $$f_{out}=((M+2)/((N+2)\times 2^R))\times f_{REF}$$

where R=0, 1, 2, or 3. M and N are integers, and N is greater than or equal to 1. The PLL N value can be programmed with any integer value from 1 to 127 for MCLK and 1 to 255 for DCLK. The PLL N value can be programmed with any integer value from 1 to 31 for MCLK or 1 to 63 for DCLK. The PLL R value has an integer value from 0 to 3. As shown in FIG. 7, the first step 200 in determining the output frequency is to calculate the value 1/(N+2). This is then applied to a phase detector 202 which in turn is coupled to a conventional charge pump 204, the output of which is provided to a loop filter 206 which in turn drives a voltage controlled oscillator 208. The output of the voltage controlled oscillator 208 is divided by the factor $2^R$. At the same time, the output signal from the VCO 208 is divided by the value (M+2) which is then applied also to the phased detector. Values M, N, and R are provided from registers, and thus may be altered dynamically.

The clock signal MCLK is used to drive the memory interface and a graphics engine in the graphics system. Normally the MCLK is generated by the internal clock synthesizer. Other clocks can be used, as shown in FIG. 8. DCLK is generated by the internal clock synthesizer. As shown in FIG. 8, DCLK1 is a pixel rate associated with the IGA-1 data path. DCLK2 is a pixel rate associated with the IGA-2 data path. These are derived as shown in FIG. 8; this derivation uses a set of multiplexers 220 through 230. SCLK is the system clock signal, provided by the host computer system. IMCLK, IDCLKA and IDCLKB are clock multiplexer output signals which are divided respectively by 2, 3, and 4 to provide respectively signals MCLK, DCLK1, and DCLK2.

This disclosure is illustrative and not limiting. Further modifications will be apparent in light of this disclosure to one of ordinary skill in the art and are intended to fall within the scope of the appended claims.

We claim:

1. A display control system for a computer, the computer including a single video memory having an output port providing pixel data for display, and including a flat panel display and a port for connecting a CRT or television display, the display control system comprising:

a first display controller having an input port connected to the output port of the video memory, and having an output port;

a digital to analog converter having an input port connected to the output port of the first display controller and having an output port connecting to the port for connecting to the CRT or television display;

a second display controller having an input port connected to the output port of the video memory and having an output port; and a flat panel display interface having an input port connected to the output port of the second display controller and having an output port for connecting to the flat panel display, wherein the first display controller drives the CRT or television display and the second display controller simultaneously and independently of the first display controller drives the flat panel display.

2. The display control system of claim 1, wherein the first and second display controllers are identical.

3. The display control system of claim 1, wherein the input port of the first display controller is a 32 bit parallel port.

4. The display control system of claim 1, further comprising a first FIFO (first in-first out) memory connected between the input port of the first display controller and the output port of the video memory, and a second FIFO memory connected to the input port of the second display controller and, in parallel to the first FIFO memory, to the output port of the video memory.

5. The display control system of claim 1, further comprising a lookup table memory connected between the output port of the first display controller and the input port of the digital to analog converter.

6. The display control system of claim 1, further comprising a lookup table memory connected between the output port of the second display controller and the input port of the flat panel display interface.

7. The display control system of claim 1, wherein the digital to analog converter is a random access memory digital to analog converter.

8. The display control system of claim 5, further comprising a video keyer having an output port selectively connected to the input port of the first lookup table memory and having at least one input port.

9. The display control system of claim 8, wherein the input port of the keyer is connected to a source of graphics data.

10. The display control system of claim 1, wherein the flat panel display interface input port has two portions, a first portion for receiving data for an upper portion of the flat panel display, and a second portion for receiving data for a lower portion of the flat panel display.

11. The display control system of claim 1, further comprising a clock generation circuit providing at least two clock signals of different frequency, a first of the clock signals being provided to the CRT or television display and a second of the clock signals being provided to the flat panel display.

12. The display control system of claim 1, wherein the single video memory provides a first image data set to the first display controller and a second differing image set to the second display controller.

13. The display control system of claim 1, wherein at least the second display controller outputs on its output port to the flat panel display a standard VGA video signal.

14. The display control system of claim 1, wherein at least the first display controller outputs on its output port a standard VGA video signal.

15. The display controller of claim 1, wherein the port connecting to the CRT or television display outputs a television signal.

16. The display controller of claim 1, wherein the first display controller programmably provides a video signal having a first pixel clock frequency and the second display controller programmably provides a video signal having a second different pixel clock frequency, thereby enabling independent operation of the flat panel display and the CRT or television display.

17. The display controller of claim 1, wherein the first display controller programmably provides a video signal having a first refresh rate and the second display controller programmably provides a video signal having a second different refresh rate.

18. The display controller of claim 1, wherein the first display controller programmably provides a video signal having a first screen resolution and the second display controller programmably provides a video signal having a second different screen resolution.

19. The display controller of claim 1, further comprising:

a first lookup table memory connected between the output port of the first display controller and the input port of the digital to analog converter; and a second lookup table memory connected between the output port of the second display controller and the input port of the flat panel display interface.

20. The display control system of claim 1, further comprising, in each of the first and second display controllers, a cursor input terminal for receiving a cursor signal for display on respectively the CRT or television display and the flat panel display.

21. The display control system of claim 1, further comprising, in each of the first and second display controllers, an icon input terminal for receiving an icon signal for display on respectively the CRT or television display and the flat panel display.

22. The display control system of claim 1, wherein the first and second display controller each programmably support a different number of bits per pixel for display on respectively the CRT or television display and the flat panel display.

23. The display control system of claims 8, wherein a first video path including the first display controller and the video keyer and a second video path including the second display controller each support a different number of bits per pixel for display.

24. The display control system of claim 1, wherein the first and second display controllers are respectively connected independently to the port for connecting to the CRT or television display and to the flat panel display interface.

25. The display controller of claim 1, wherein the first and second display controllers output identical types of signals.

26. The display control system of claim 1, wherein the first and second display controllers generate addresses for addressing the video memory and the first display controller generates display and timing signals for control of the CRT or television display and the second display controller generates display and timing signals for control of the flat panel display.

27. A method of operating a computer system having a single video memory, a CRT or television display, and a flat panel display, each of the CRT or television display and the flat panel display having an associated display controller connected to the single video memory, the method comprising:

providing a first image data set to a first display controller associated with the CRT or television display from the video memory; and providing a second image data set to a second display controller associated with the flat panel display from video memory, wherein the first image data set differs from the second image data set, wherein the first display controller drives the CRT or television display and the second display controller simultaneously and independently of the first display controller drives the flat panel display.

28. The method of claim 27, wherein the first and second display controllers are respectively connected independently to the CRT or television display and to the flat panel display.

29. The method of claim 27, wherein the first and second display controllers output identical types of signals.

30. The method of claim 27, further comprising:
the first and second display controllers generating addresses for addressing the single video memory;
the first display controller generating display and timing signals for control of the CRT or television display; and
the second display controller generating display and timing signals for control of the flat panel display.

* * * * *